Sept. 29, 1953 L. R. TERRY 2,653,779
AIRCRAFT HAVING REVERSIBLE JETPROPELLED ROTOR BLADE
Filed Aug. 6, 1951 2 Sheets-Sheet 1

INVENTOR.
Loren R. Terry
BY
ATTORNEY

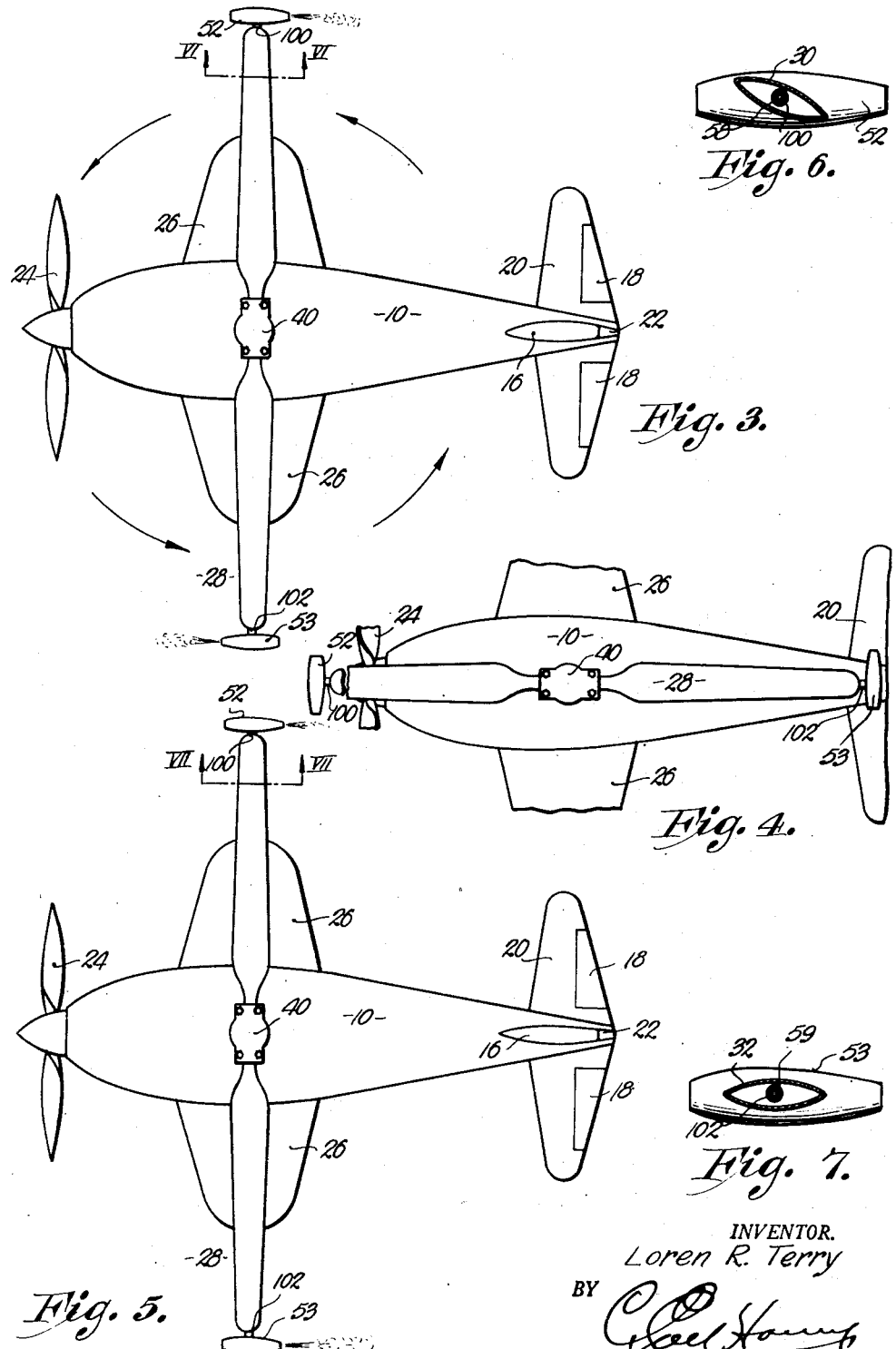

Patented Sept. 29, 1953

2,653,779

UNITED STATES PATENT OFFICE 2,653,779

AIRCRAFT HAVING REVERSIBLE JET-PROPELLED ROTOR BLADE

Loren R. Terry, Webb City, Mo.

Application August 6, 1951, Serial No. 240,508

2 Claims. (Cl. 244—7)

This invention relates to convertible aircraft of the kind having a rotating wing capable of attainment of lift, and a fixed wing for supplying supporting surfaces during flight all in combination with a separate means of propulsion coopererable with the motivating structure for the rotating wing in producing high forward speed.

Fixed-wing aircraft, while capable of tremendous speed, require long runways for take-off and landing. Conversely, helicopters are limited to a low forward speed. Consequently, there is a need for structure that combines the advantageous features of each while maintaining factors of safety, practicability, inexpensiveness, and ease of operation and maintenance.

While many attempts have heretofore been made to combine helicopter principles in fixed wing aircraft in combination with propeller motivation, so far as I am aware, none have proved satisfactory, perhaps primarily because all present-day helicopters, with or without separate means of propulsion, are inherently limited in speed.

It is the primary object of this invention therefore, to provide convertible aircraft wherein the means for driving the rotary wing may be placed in operation during flight to assist a primary means of propulsion in obtaining increased speed.

Another object heerof is to provide fixed wings in combination with the features just above mentioned to unload the rotary wing during conversion and to assist the same in supporting the aircraft during forward flight at high speeds.

It is the most important object of this invention to provide a flying machine wherein a rotary wing, provided primarily for vertical lift, may be converted during flight to operate not only as a fixed wing but to cooperate with a primary means of propulsion in increasing the speed of the machine over ordinary helicopters.

An object of this invention is the provision of a jet-propelled rotor system wherein the pitch of the blades may be varied during flight for lifting or supporting purposes as desired, one of the blades being fully invertible, thereby alternately adapting the jet engine thereof as a prime mover for the rotor and as an auxiliary propulsion means.

In the drawings:

Figure 1 is a side elevational view of aircraft having a reversible jet propelled rotor blade made pursuant to my present invention.

Fig. 2 is an enlarged, fragmentary, sectional view showing a portion of the fuselage of the aircraft illustrated in Fig. 1 together with the rotor support and operating mechanism forming a part thereof.

Fig. 3 is a top plan view of the aircraft illustrating the position of the rotor blades during take-off or landing.

Fig. 4 is a fragmentary, top plan view illustrating the position of the rotor during conversion.

Fig. 5 is a top plan view illustrating the position of the rotor blades during forward flight.

Fig. 6 is a cross-sectional view taken on line VI—VI of Fig. 3; and

Fig. 7 is a cross-sectional view taken on line VII—VII of Fig. 5.

Convertible aircraft must have a speed range that is appreciably greater than is made possible by either the fixed wing or rotary wing types to render the same commercially practical without sacrificing power, ease of control, stability, safety, response to operator demands and other characteristics generally deemed important in the field of aerodonetics. Such considerations have all been given careful attention in producing the machine hereinafter more fully described.

A fuselage broadly designated by the numeral 10, may be of conventional character and be provided with a conventional landing gear 12, fin 16, elevator 18, stabilizer 20, rudder 22 and propeller 24. Likewise, in the convertible aircraft forming the subject matter hereof, relatively short wings 26 are provided that may include ailerons (not shown). Obviously, a prime mover not shown, will be provided for the propeller 24. In addition to propeller 24 there is provided a rotor 28 having a pair of blades 30 and 32 rotatably mounted upon the uppermost end of a tubular standard 34 carried by the fuselage 10.

Standard 34 extends downwardly into the fuselage 10 through an opening 36 provided in the latter and an outturned flange 38 on the standard 34 is secured to the fuselage 10 in any suitable manner.

Tubular blades 30 and 32 are mounted in a hollow cross-head 40 for rotation on their longitudinal axes through the medium of a plurality of bearings 42 carried by the cross-head 40. Cross-head 40 is in turn rigidly secured to a tube 44 having an out-turned flange 46 upon the uppermost end thereof, and bolts 48 secure the cross-head directly to flange 46. Tube 44 extends downwardly into the standard 34 and is supported by bearings 50 interposed between tube 44 and standard 34.

Rotation is imparted to the rotor 28 through the medium of jet engines 52 and 53 at the tips of wings 30 and 32 and fuel is supplied thereto by means of a primary line 54 extending vertically through the tube 44 and through an opening 56 within the cross-head 40. Branch lines 58 and 59 are telescoped within the blades 30 and 32 respectively, and connect directly with the jet engines 52 and 53. The innermost ends of the lines 58 and 59 join with the main line 54 by a suitable coupling 60 capable of permitting rotation of the branches 58 and 59 with the main line 54 or relative thereto while maintaining a fluid-tight joint.

Each blade 30 and 32 is provided with a bevel gear 62 on the innermost end thereof within the cross-head 40 in constant mesh with pinions 64 upon the uppermost ends of shafts 66 and 67 which are rotatably supported by the cross-head 40 and by the tube 44 within the latter and having gears 68 and 69 on the lowermost ends thereof, below tube 44 but within the standard 34. Braking means for holding the rotor 28 against rotation may include a split band 70 circumscribing the tube adjacent its lowermost end within the standard 34, one of such ends of the band 70 being fixed and the other having pivotal connection with a handle 72, swingably supported by a bracket 74 on fuselage 10. A positive lock for holding the rotor 28 against rotation includes a horizontally reciprocable bar 76 slidably carried by brackets 78 on fuselage 10 and reciprocated through the medium of a swingable lever 80 and operably connected with the bar 76 as at 82. A clearance opening 84 is provided for the bar 76 within the standard 34 and the tube 44 is provided with two openings 86 and 87, spaced 90 degrees, for receiving the bar 76 when the same is at one end of its path of travel as shown in Fig. 2.

Rotation is imparted to the shafts 66 and 67 through the medium of ring gears 88 and 90 vertically reciprocable within the standard 34 and reciprocated through the medium of a swingable lever 92 connected thereto as at 94. It is seen that the gear 88, shown in Fig. 2 in the neutral position, moves into meshing relationship with the gear 69 when the gear 88 is raised, and meshes with the gear 68 when the gear 88 moves downwardly, all through manipulation of lever 92.

A small pinion 96 on the uppermost end of a crank 98 is brought into meshing relationship with the gear 90 to rotate the same upon sliding of the crank 98 upwardly with respect to standard 34 upon which it is mounted.

Jet engines 52 and 53 are mounted on the outermost ends of a pair of tubes 100 and 102 respectively, tube 100 being within the blade 30, surrounding pipe 58 and secured to cross-head 40 by a lateral extension 104. Tube 102 within blade 32, surrounds pipe 59 and has a bevel gear 106 on its inner end, meshing with a pinion 108 on the upper end of a rod 110, telescoped with the shaft 67.

A gear 112 on a crank 114 meshes with a gear 116 on the lowermost end of rod 110 when crank 112 is shifted upwardly relative to standard 34 on which it is mounted.

A sleeve 118 threaded as at 119, and depending from tube 44, has a vertically reciprocable collar 120 thereon that in turn is provided with a pair of spaced, annular, external, beveled braking elements 122 and 124. Elements 122 and 124 cooperate with similar beveled braking elements 126 and 128 respectively, on gear 68 and on the rod 110 when collar 120 is moved upwardly on sleeve 118. A nut 130 on threads 119 controls such movement of collar 120. Another braking element 132 cooperates with element 122 and is mounted on the lower end of the shaft 67.

On take-off, it is to be preferred that both the prime mover for propeller 24, as well as the jet engines 52 and 53, be energized and during such take-off, rotor 28 is rotated when the jet engines 52 and 53 are positioned as illustrated in Figs. 3 and 4 of the drawings. After the aircraft has reached a suitable height, the supply of fuel to the engines 52 and 53 by way of line 54 and branches 58 and 59, is cut off through conventional controls not herein illustrated. Fixed wings 26 will thereupon operate to support the plane while propulsion is provided for by the propeller 24. At this point it is notable that inasmuch as rotor blade 28 functions primarily to raise and lower the plane, fixed wings 26 need only be sufficiently large to stabilize the plane once the same has reached a reasonable altitude.

As soon as the engines 52 and 53 are deenergized, the rotating wing 28 will tend to assume the position shown in Fig. 4 of the drawings, but in order to hasten the discontinuance of its rotation, the pilot may manipulate handle 72 to operate brake 70 and thereby cause such rotation to cease through the action of brake 70 on tube 44.

When the rotor 28 is in the position shown in Fig. 4 of the drawings, it may be locked against rotation or swinging movement in either direction by manipulation of lever 80, thereby actuating bar 76 and forcing the same into the opening 87. The operator thereupon manipulates nut 130 to release brakes 122—126 and brakes 124—128—132. With the rotor 28 thus locked against rotation, the blades 30 and 32 may be tipped from the position shown in Fig. 6 of the drawings to the position shown in Fig. 7 of the drawings, by operation of crank 98 and lever 92. With gear 88 in mesh with the gear 68, and with gear 96 in mesh with the gear 90, turning of crank 98 will thus position the blade 30 as shown in Fig. 7. The operator thereupon moves the gear 88 in mesh with the other gear 69 and through use of crank 98, changes the pitch of the blade 32. By manipulation of crank 114 to bring gear 112 into mesh with gear 116 and to rotate rod 110, tube 102 for engine 53 is rotated through gears 106—108 to rotate engine 53, 180 degrees, the inverted position being shown in Fig. 5. Next, nut 130 is rotated on sleeve 118 to force collar 120 upwardly until element 122 engages elements 126 and 132, and until braking means 124 engages beveled member 128, locking blades 30 and 32, as well as engine 53 against rotation relative to cross-head 40. After bar 76 is released, the rotor 28 is caused to swing 90 degrees from the position shown in Fig. 4 and again locked in the position illustrated by Fig. 5 through the medium of bar 76 and opening 86.

With jet engines 52 and 53 again operating and with the blades 30 and 32 positioned as shown in Fig. 7, engines 52 and 53 will operate to provide increased, forward speed in cooperation with the operation of propeller 24, and also cooperate with the fixed wings 26 in providing support for the plane.

Before landing, the operation just above described, is reversed.

It is clear that during rotation of the rotor 28, blades 30—32, tubes 100—102, pipes 58—59, pipe 54, cross-head 40, tube 44, shafts 66 and 67, and rod 110 rotate as a unit and no rotation of the blades 30—32 on their longitudinal axes takes place so long as gear 88 is in the neutral position shown in Fig. 2, gears 68, 69 and 116 being held by brake collar 120 and revolving therewith about the axis of tube 44.

All of the advantages and objects of the convertible aircraft herein described as initially set forth will now become apparent to those skilled in this field, and while details of construction may vary considerably, it is desired to be limited only by the spirit of the invention as defined by the scope of the appended claims.

Having thus described the invention what is claimed as new and desired to be secured by Letters Patent is:

1. In a convertible aircraft of the kind having a fuselage, a tail assembly on the fuselage, a rotatable wing mounted on the fuselage for rotation in one direction on a normally vertical axis and having a pair of elongated blades each normally transversely inclined from the plane of rotation of the wing in the same direction relative to said direction of rotation of the wing, and a pair of prime movers each adapted for exerting a propulsive force in one direction only relative to itself and mounted for rotation with the wing for rotating the latter in its said direction of rotation to provide rotary wing means of upward propulsion for the aircraft during vertical flight, structure for providing a fixed lifting plane and means of forward propulsion for the aircraft during forward flight, said structure including releasable means having parts operably coupled with the wing for holding the latter in a predetermined position against rotation on said normally vertical axis; means for each blade respectively mounting the same for rotation on its longitudinal axis separately from the other blade for varying the pitch of the blades relative to the fuselage and to each other; means having parts operably coupled with each blade respectively for varying the pitch thereof to provide a fixed lifting plane for the aircraft; means for holding one of the prime movers against movement relative to the wing to provide a means of forward propulsion for the aircraft when the wing is held in said predetermined position; means mounting the other of the prime movers for rotation on an axis substantially perpendicular to said normally vertical axis of rotation of the wing thereby adapting said other prime mover for inversion; and means having parts operably coupled with said other prime mover for inverting the latter to provide an additional means of forward propulsion for the aircraft when the wing is held in said predetermined position.

2. A convertible aircraft comprising a fuselage; a tail assembly on the fuselage; a rotary wing having a pair of elongated, radial blades; means mounting the wing on the fuselage for rotation thereabove on a normally substantially vertical axis; a pair of prime movers; means mounting one prime mover at the outer end of one blade in a fixed, predetermined position relative to the longitudinal axis of said one blade and against rotation about said axis of the latter; means mounting the other prime mover at the outer end of the other blade for rotation about the longitudinal axis of the latter, whereby said other prime mover is invertible on said axis of said other blade; means for each blade respectively mounting the same for rotation on their respective longitudinal axes separately from each other and from either of the prime movers to vary the pitch of each blade relative to the fuselage; means having parts operably coupled with each of the blades respectively for varying the pitch thereof; releasable means having parts operably coupled with the wing for holding the latter against rotation about said substantially vertical axis; and means having parts operably coupled with said other prime mover for inverting the latter.

LOREN R. TERRY.

References Cited in the file of this patent
UNITED STATES PATENTS

| Number | Name | Date |
|---|---|---|
| 1,398,750 | Stewart | Nov. 29, 1921 |
| 2,001,529 | Dornier | May 14, 1935 |
| 2,438,151 | Davis | Mar. 23, 1948 |
| 2,511,025 | Tucker | June 13, 1950 |
| 2,544,497 | Herrick | Mar. 6, 1951 |
| 2,582,893 | Teague | Jan. 15, 1952 |